United States Patent
Strock

(10) Patent No.: US 9,926,794 B2
(45) Date of Patent: Mar. 27, 2018

(54) TURBINE BLADE TIP TREATMENT FOR INDUSTRIAL GAS TURBINES

(71) Applicant: United Technologies Corporation, Hartford, CT (US)

(72) Inventor: Christopher W. Strock, Kennebunk, ME (US)

(73) Assignee: United Technologies Corporation, Farmington, CT (US)

(*) Notice: Subject to any disclaimer, the term of this patent is extended or adjusted under 35 U.S.C. 154(b) by 271 days.

(21) Appl. No.: 14/774,573

(22) PCT Filed: Mar. 12, 2014

(86) PCT No.: PCT/US2014/024983
§ 371 (c)(1),
(2) Date: Sep. 10, 2015

(87) PCT Pub. No.: WO2014/151101
PCT Pub. Date: Sep. 25, 2014

(65) Prior Publication Data
US 2016/0032737 A1    Feb. 4, 2016

Related U.S. Application Data

(60) Provisional application No. 61/789,767, filed on Mar. 15, 2013.

(51) Int. Cl.
*F01D 5/28* (2006.01)
*F01D 11/08* (2006.01)
(Continued)

(52) U.S. Cl.
CPC .............. *F01D 5/288* (2013.01); *F01D 11/08* (2013.01); *F01D 11/122* (2013.01); *F01D 25/24* (2013.01);
(Continued)

(58) Field of Classification Search
CPC .......... F01D 5/284; F01D 5/288; F01D 11/08; F01D 11/122; F01D 25/24;
(Continued)

(56) References Cited

U.S. PATENT DOCUMENTS 5,059,095 A    10/1991 Kushner et al.
5,551,840 A    9/1996 Benoit et al.
(Continued)

FOREIGN PATENT DOCUMENTS

EP    0166676 A2    1/1986
EP    0484115 A1    5/1992
(Continued)

OTHER PUBLICATIONS

International Search Report and Written Opinion from PCT Application Serial No. PCT/US2014/024983, dated Jul. 17, 2014, 12 pages.

(Continued)

*Primary Examiner* — Igor Kershteyn
(74) *Attorney, Agent, or Firm* — Kinney & Lange, P.A.

(57) ABSTRACT

A method of preventing transfer of metal of a gas turbine rotor blade having a metal tip to a blade outer air seal coating on a gas turbine case includes forming a coating on the metal tip. The coating comprises a bond coat layer on the metal tip and a ceramic filled metallic layer having a ceramic component in a matrix of a metal MCr, MCrAl, MCrAlY or a refractory modified MCrAlY where M is nickel, cobalt, iron or mixtures thereof.

9 Claims, 1 Drawing Sheet

(51) Int. Cl.
*F01D 25/24* (2006.01)
*F01D 11/12* (2006.01)

(52) U.S. Cl.
CPC .......... *F01D 5/284* (2013.01); *F05D 2220/32* (2013.01); *F05D 2230/31* (2013.01); *F05D 2240/307* (2013.01); *F05D 2300/171* (2013.01); *F05D 2300/173* (2013.01); *F05D 2300/177* (2013.01); *F05D 2300/211* (2013.01); *F05D 2300/2106* (2013.01); *F05D 2300/2112* (2013.01); *F05D 2300/2118* (2013.01); *F05D 2300/506* (2013.01); *F05D 2300/6032* (2013.01); *F05D 2300/611* (2013.01); *Y02T 50/673* (2013.01)

(58) Field of Classification Search
CPC ............. F05D 2220/32; F05D 2230/31; F05D 2240/307; F05D 2300/171; F05D 2300/173; F05D 2300/177; F05D 2300/6032; F05D 2300/2118; F05D 2300/2112; F05D 2300/211; F05D 2300/2106; F05D 2300/611; F05D 2300/506; Y02T 50/673
See application file for complete search history.

(56) References Cited

U.S. PATENT DOCUMENTS

| | | |
|---|---|---|
| 5,952,110 A | 9/1999 | Schell et al. |
| 6,102,656 A | 8/2000 | Nissley et al. |
| 6,641,907 B1* | 11/2003 | Merrill ............... C04B 38/0038 |
| | | 428/313.9 |
| 2005/0129511 A1 | 6/2005 | Allen |
| 2007/0099011 A1 | 5/2007 | Wilson |
| 2008/0166225 A1 | 7/2008 | Strangman et al. |
| 2010/0173094 A1 | 7/2010 | Mainer et al. |
| 2014/0093360 A1* | 4/2014 | Strock ................... F01D 11/122 |
| | | 415/173.4 |

FOREIGN PATENT DOCUMENTS

| | | |
|---|---|---|
| WO | 2014055299 A1 | 4/2014 |
| WO | 2014074370 A2 | 5/2014 |

OTHER PUBLICATIONS

Extended European Search Report, for European Patent Application No. 14769696.7, dated Oct. 14, 2016, 9 pages.

* cited by examiner

TURBINE BLADE TIP TREATMENT FOR INDUSTRIAL GAS TURBINES

BACKGROUND

Large power generation turbines have a number of uses, such as driving a shaft to a generator or on the propeller of a large ship, for example. These turbines use thermal barrier coatings as blade outer air seal coatings in the hot section of the turbine. Due to the slow response rate of these large turbines, rub does not typically occur early in life like it does in aircraft engines.

When the rub does happen, it is at a slow interaction rate, high temperature and generally with high tip speeds. In this combination of conditions, the metal of the blade tips smears and galls to the ceramic blade outer air seal. This transferred material causes an increase in roughness on both the blade tips and outer air seal with associated aerodynamic looses and creates high spots on the outer air seals that then contact and remove material from, normally not contacting, blade tips resulting in an increased tip gap and a loss in performance.

These large power generation turbines will have better performance if metal transfer can be avoided.

SUMMARY

This invention prevents metal transfer to the ceramic blade outer air seal by applying a material to the blade tip that exhibits reduced material transfer to the blade outer air seals. The material includes a bond coat layer on the blade tip with a ceramic filled metallic layer on top of the bond coat layer. Ceramic is defined here to include the family of self-lubricating materials known as MAX phase materials.

The bond coat may be MCr, MCrAl, MCrAlY or a refractory modified MCrAlY, where M is nickel, cobalt, iron or mixtures thereof.

The blade tip coating contains ceramic particles in a matrix of MCr, MCrAl, MCrAlY or a refractory modified MCrA.Y where M is nickel, cobalt, iron or mixtures thereof.

The ceramic particles may be present in the coating with morphology retained from its manufacturing method or they may be irregularly flattened shapes that are described as "splats" in the thermal spray field. The ceramic particles may be any ceramic that has a hardness of seven or more on the Mohs Scale for hardness, such as silica, quartz, alumina and zirconia or may be a solid lubricant such as hexagonal boron nitride (hBN) or a MAX phase material. The hard particles act to limit metal buildup on the outer air seal by wholly or partially removing the transferred material while the self-lubricating filler interferes with adhesive metal transfer to the outer air seal.

The MAX phase materials are defined by the formula $M_{n+1}AX_n$, where M is selected from the early transition metals. A is selected from A-group elements, X is selected from the group consisting of C or N and n=1 to 3.

DETAILED DESCRIPTION

Figure 1:
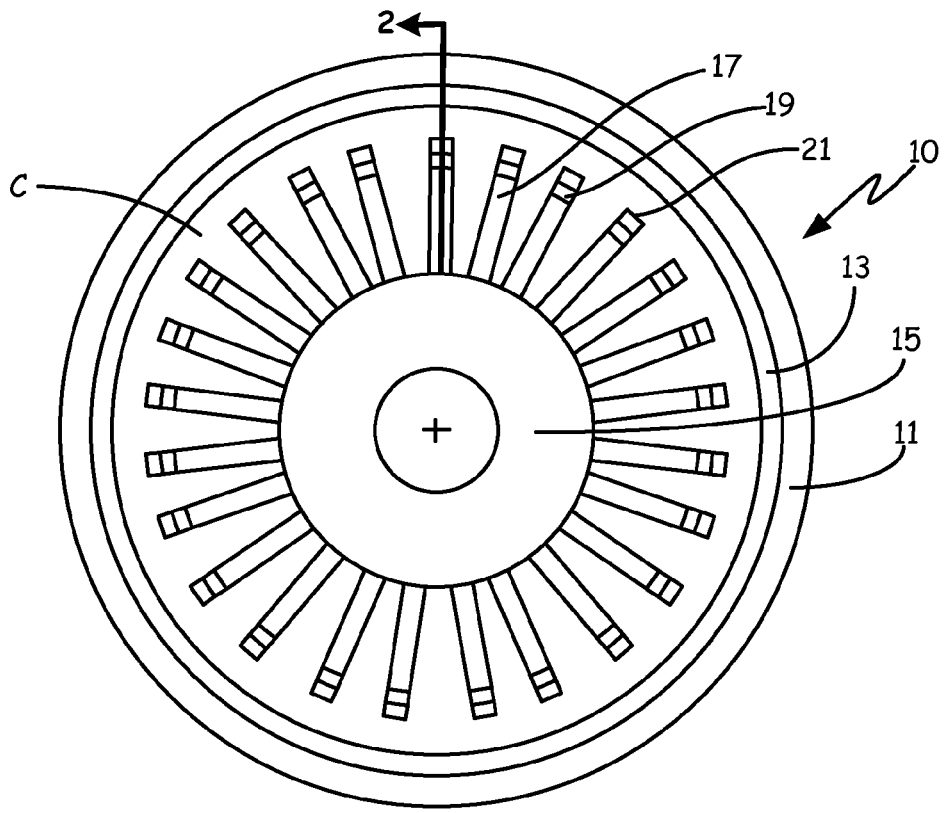
FIG. 1 illustrates a simplified cross sectional view of a rotor shaft inside a casing illustrating the relationship of the blade outer air seal and rotors with tips.
Figure 2:
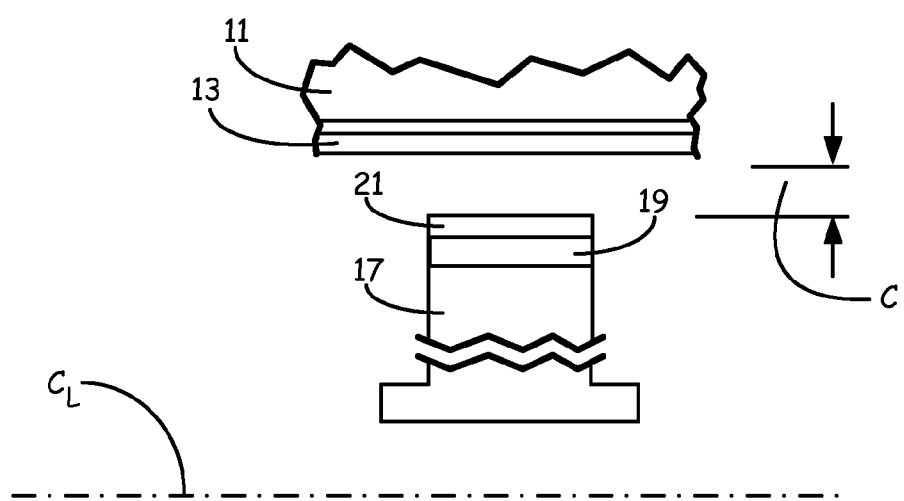
FIG. 2 is a cross sectional view taken along the line 2-2 of FIG. 1, not to scale.

As can be seen from FIG. 1 and FIG. 2, a large turbine 10, generally, of the type used in connection with generators, for example, includes casing 11 with blade outer air seal coating 13. Power generators are one intended use of this invention and it is also contemplated for use with marine and land based turbines that may or may not have a fan or propeller. Turbine 10 also includes a shaft 15 with a plurality of blades 17 radiating from centerline $C_L$. Blades 17 have a first bond coat layer 19 on the tip of blades 17 and an abrasive layer 21 on bond coat layer 19. These layers may be applied by brazing a pressed and sintered layer or by thermal spraying.

Top ceramic filled metallic layer 21 is a composite of MCr, MCrAl, MCrAlY or a refractory modified MCrAlY, where M is nickel, cobalt, iron or mixtures thereof, into which ceramic particles have been added by thermal spraying. The metal alloy and ceramic may be deposited as a coating by individually feeding the powders to one or more spray torches or by blending the two powders and air plasma spraying (APS). Other spray processes would also be effective, such as combustion flame spray, HVOF, HVAF, LPPS, VPS, HVPS and the like. As part of the coating is a quantity of ceramic particles, the ceramic particles may be captured in the coating as unmelted inclusions retaining their original particle morphology or may at least partially melt during the spray process to form disc like flat particles, or splat particles.

The hard ceramic particles may be any ceramic that has a hardness of seven or more on the Mohs Scale for hardness, such as silica, quartz, alumina and zirconia and that at least partially melts at the spray temperatures. The amount of ceramic in this coating ranges from about 1% to about 15% by volume. Porosity makes up from about 1% to about 10% by volume, with the remainder being metal alloy.

Alternatively, a self-lubricating filler may be added in place of the hard ceramic particles. The amount of self-lubricating filler in coating 21 ranges from about 1% to about 50% by volume. Porosity makes up from about 1% to 10% by volume with the remainder being metal alloy.

In a third alternate combination, both hard ceramic particles and self-lubricating filler are added to the metal matrix. The amount of ceramic hard particles makes up about 1% to 15% by volume with a minimum of 40% by volume metal matrix and self-lubricating filler being the balance.

Attachment of the ceramic filled layer 21 to the airfoil 17 may be enhanced by including a bond coat layer on the airfoil tip. The bond coat may be MCr, MCrAl, MCrAlY or a refractory modified MCrAlY, where M is nickel, cobalt, iron or mixtures thereof.

Bond coat 19 is thin, up to 10 mils (254 microns), more specifically ranging from about 3 mils to about 7 mils (about 76 to about 178 microns). The ceramic filled metallic coating 21 may be about the same thickness as bond coat 64, again ranging from about 3 mils to about 7 mils (about 76 to about 178 microns), while some applications that have larger variation in tip clearance may require a thicker ceramic filled layer. Layer 21 may be as thick as 300 mils (7620 microns) in some applications.

FIG. 2 shows blade 17, partially cut away, with bond layer 19 and abrasive layer 21, not to scale. Clearance C is expanded for purposes of illustration. In practice, clearance C may be, for example, in a range of about 0.025 inches (0.06125 cm) to 0.055 inches (0.1397 cm) when the engine is cold and 0.000 to 0.035 inches (0.0 to 0.0889 cm) during engine operation, depending on the specific operating conditions and previous rub events that may have occurred.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are nonexclusive descriptions of possible embodiments of the present invention.

A method of preventing transfer of metal of a gas turbine rotor blade having a metal tip to a blade outer air seal coating. A coating on the blade tip of a ceramic filled metallic layer having a ceramic component in a matrix of MCr, MCrAl, MCrAlY or a refractory modified MCrAlY where M is nickel, cobalt, iron or mixtures thereof.

The method of the preceding paragraph can optionally include additionally and/or alternatively, any one or more of the following features, configurations and/or additional components.

The method may include having a bond coat layer on the metal tip.

The ceramic component has a hardness of seven or more on the Mohs Scale.

The ceramic component can be selected from the group consisting of silica, quartz, alumina, zirconia and mixtures thereof.

The metal may be selected from the group consisting of nickel, cobalt, copper, iron, aluminum and mixtures thereof.

The ceramic component may be selected from the group consisting of silica, quartz, alumina, zirconia and mixtures thereof and the metal may be selected from the group consisting of MCr, MCrAl, MCrAlY or a refractory modified MCrAlY where M is nickel, cobalt, iron or mixtures thereof.

A rotor and blade seal coating preventing transfer of metal of a gas turbine rotor blade having a metal tip to a blade outer air seal coating. A coating on the blade tip comprises a ceramic filled metallic layer having a ceramic component in a matrix of MCr, MCrAl, MCrAlY or a refractory modified MCrAlY where M is nickel, cobalt, iron or mixtures thereof.

The rotor and blade seal coating of the preceding paragraph can optionally include additionally and/or alternatively, any one or more of the following features, configurations and/or additional components.

The ceramic component has a hardness of seven or more on the Mohs Scale.

The ceramic component can be selected from the group consisting of silica, quartz, alumina, zirconia and mixtures thereof.

The metal may be selected from the group consisting of nickel, cobalt, copper, iron, aluminum and mixtures thereof.

The amount of nickel, cobalt, copper, iron or aluminum may range from about 30% to about 60% by volume, and the balance is hBN.

The ceramic component may be selected from the group consisting of silica, quartz, alumina, zirconia and mixtures thereof and the metal is MCr, MCrAl, MCrAlY or a refractory modified MCrAlY where M is nickel, cobalt, iron or mixtures thereof.

A gas turbine engine having a plurality of rotor blades having a metal tip and a blade outer air seal coating A coating on the blade tip includes a ceramic filled metallic layer having a ceramic component in a matrix of MCr, MCrAl, MCrAlY or a refractory modified MCrAlY where M is nickel, cobalt, iron or mixtures thereof.

The gas turbine engine having a plurality of rotor blades having a metal tip and a blade outer air seal coating of the preceding paragraph can optionally include additionally and/or alternatively, any one or more of the following features, configurations and/or additional components.

The engine may have a bond coat on the metal tip.

The ceramic component has a hardness of seven or more on the Mohs Scale.

The ceramic component can be selected from the group consisting of silica, quartz, alumina, zirconia and mixtures thereof.

The metal may be selected from the group consisting of nickel, cobalt, copper, iron, aluminum and mixtures thereof.

The ceramic component may be selected from the group consisting of silica, quartz, alumina, zirconia and mixtures thereof and the metal may be selected from MCr, MCrAl, MCrAlY or a refractory modified MCrAlY where M is nickel, cobalt, iron or mixtures thereof.

The invention claimed is:

1. A method of preventing transfer of metal of a gas turbine rotor blade having a metal tip to a blade outer air seal coating, comprising:
   a blade outer air seal coating on a gas turbine case; and
   a coating on the metal tip, the coating comprising a ceramic filled metallic layer having a ceramic component in a matrix of a metal;
   wherein the ceramic component is selected from the group consisting of silica, quartz, alumina, zirconia and mixtures thereof and the metal is selected from the group consisting of MCr, MCrAl, MCrAlY or a refractory modified MCrAlY where M is nickel, cobalt, iron or mixtures thereof.

2. The method of claim 1, wherein the ceramic component has a hardness of seven or more on the Mohs Scale.

3. The method of claim 1, which further includes a bond coat on the metal tip between the metal tip and the ceramic filled metallic layer.

4. A rotor and blade seal coating preventing transfer of metal of a gas turbine rotor blade having a metal tip to a blade outer air seal coating, comprising:
   a blade outer air seal coating on a gas turbine case; and
   a coating on the metal tip, the coating comprising a ceramic filled metallic layer having a ceramic component in a matrix of a metal;
   wherein the ceramic component is selected from the group consisting of silica, quartz, alumina, zirconia and mixtures thereof and the metal is selected from the group consisting of MCr, MCrAl, MCrAlY or a refractory modified MCrAlY where M is nickel, cobalt, iron or mixtures thereof.

5. The rotor and blade seal coating of claim 4, wherein the ceramic component has a hardness of seven or more on the Mohs Scale.

6. The rotor and blade seal coating of claim 4 which further include a bond coat on the metal tip between the metal tip and the ceramic filled metallic layer.

7. In a gas turbine engine having a plurality of rotor blades having a metal tip and a blade outer air seal coating, comprising:
   a blade outer air seal coating on a gas turbine case; and
   a coating on the metal tip, the coating comprising a ceramic filled metallic layer;

wherein the ceramic component is selected from the group consisting of silica, quartz, alumina, zirconia and mixtures thereof and the metal is selected from the group consisting of MCr, MCrAl, MCrAlY or a refractory modified MCrAlY where M is nickel, cobalt, iron or mixtures thereof.

8. The gas turbine engine of claim 7, wherein the ceramic component has a hardness of seven or more on the Mohs Scale.

9. The gas turbine engine of claim 7, which further includes a bond coat on the metal tip, the bond coat being between the metal tip and the ceramic filled metallic layer.

* * * * *